US006326972B1

(12) United States Patent
Buhler et al.

(10) Patent No.: US 6,326,972 B1
(45) Date of Patent: Dec. 4, 2001

(54) 3D STROKE-BASED CHARACTER MODELING SUITABLE FOR EFFICIENTLY RENDERING LARGE CROWDS

(75) Inventors: Juan J. Buhler, Mountain View; Luca Prasso, Milpitas, both of CA (US)

(73) Assignee: Pacific Data Images, Inc., Palo Alto, CA (US)

( * ) Notice: Subject to any disclaimer, the term of this patent is extended or adjusted under 35 U.S.C. 154(b) by 0 days.

(21) Appl. No.: 09/138,201

(22) Filed: Aug. 21, 1998

(51) Int. Cl.$^7$ ........................................................ G06F 15/00
(52) U.S. Cl. ................................................................ 345/474
(58) Field of Search ................................... 345/429, 430, 345/113, 114, 473, 474, 475

(56) References Cited

PUBLICATIONS

Hsu, S. C. and Lee, I.H.H., "Drawing and Animation Using Skeletal Strokes," SIGGRAPH '94, Computer Graphics Proceedings, Annual Conference Series, pp. 109–118, Jul. 24–29, 1994.
Meier, B. J., "Painterly Rendering for Animation," SIGGRAPH '96, Computer Graphics Proceedings, Annual Conference Series, pp. 477–484, Aug. 4–9, 1996.
Reeves, W. T., "Particle Systems—A Technique for Modeling a Class of Fuzzy Objects," SIGGRAPH '83 Computer Graphics Conference Proceedings, vol. 17, No. 3, pp. 359–376, Jul. 25–29, 1983.
Reeves, W. T. and Blau, R., "Approximate and Probabilistic Algorithms for Shading and Rendering Structured Particle Systmes," SIGGRAPH '85 Computer Graphics Conference Proceedings, vol. 19, No. 3, pp. 313–322, Jul. 22–26, 1985.

*Primary Examiner*—Phu K. Nguyen
(74) *Attorney, Agent, or Firm*—Fenwick & West LLP (57) ABSTRACT

A system, method, and software product provide an efficient mechanism for rendering characters for computer based animation. The operation of the system is particularly well suited to the rendering of scenes of large numbers of characters, such as scenes of large crowds. The system uses a stroke based character model for a character, which is a collection of strokes, defined in a three dimensional coordinate system of a character, and associated with a geometric model of the character. This stroke model of the character and its association to the geometric model enables the strokes to move or change position over time as the character moves. The stroke model reduces the amount of data needed to accurately represent the character, particularly its shadows and silhouettes. Using the stroke models for many instances of characters within a frame or sequence of frames of animation, the system determines the positions of the characters in a global coordinate system in the frame, and then determines the respective positions of the stroke models of the characters, also in the global coordinate system. This collection of strokes is then input into a renderer, along with a camera model and a lighting model in order to render a final image of a frame or frame sequence. A preferred renderer is a particle renderer which draws each stroke through a series of control points which define the stroke.

23 Claims, 10 Drawing Sheets

3D STROKE-BASED CHARACTER MODELING SUITABLE FOR EFFICIENTLY RENDERING LARGE CROWDS

BACKGROUND

1. Field of Invention

The present invention relates generally to computer based animation, and more particularly to animating characters in three dimensional (3D) environments. The present invention is also directed to animation techniques for animating scenes with crowds of objects and characters.

2. Background of the Invention

Motion pictures often include scenes of large crowds. For example, battlefields, stadiums, busy urban street scenes, and the like are found in many motion pictures. The most basic conventional film based approach to producing scenes of large crowds was hiring a "cast of thousands" to be the crowd and actually filming the scene. This approach is expensive, time consuming, and often impractical. More sophisticated approaches, for example to fill a stadium, include using a small number of live actors and large numbers of cardboard cutouts of people, or photographing a small number of actors and compositing their images multiple times to create the appearance of a crowd.

Computer-based animation of motion pictures also requires the ability to produce crowd scenes. However, the current technology paradigm of polygon based rendering makes animation of crowds extremely time consuming to produce. Polygon rendering takes a 3D model of a character and covers the surface of the model with a mesh of polygons, each of which has various color, transparency, and/or texture attributes. In conjunction with a lighting model defining sources of lighting and a camera model defining a point of view, the polygons of the model are rendered into an image. Depending on the size and detail of a character, to obtain a realistic, smooth surface of complex character may require about 1,000 polygons are used for each character.

For large crowd scenes, with 1,000 to 10,000 characters, each of a very small size in a final image, it is the silhouettes and shadows of the characters that need to be realistic in order to produce the best animation effects. With a polygon-based animation system, 1,000 characters with 1,000 polygons each would require rendering 1,000,000 polygons for a single frame of animation. At 24 frames per second, a short 1 minute scene would require 1.44 billion polygons rendered. Even at the extremely high speed of 1,000 polygons per second, this 1 minute scene would take about 400 hours to render. Hence, feature length films with many extensive crowd scenes become unworkable with polygon rendering. If the number of polygons per character is reduced in order to speed rendering, then the resulting character silhouettes and shadows become very angular, blocky and unrealistic looking. Thus, polygon rendering, while useful for very small numbers of characters and polygons per frame, becomes unwieldy for crowd scenes. This accounts in part for the lack large crowd scenes of more than a few seconds in current computer animated films.

Accordingly, it is desirable to provide a system and method of rendering 3D character models that can support high speed rendering of large crowds of characters, without sacrificing realistic shadows, silhouettes and movement of the characters.

SUMMARY OF THE INVENTION

The present invention overcomes the limitations of conventional animation systems by providing a fully three-dimensional (3D) stroke-based character animation system and method. The present invention further provides a stroke-based character model, and a user interface particularly adapted for designing the stroke-based character model. Characters may be any object that exhibits movement over time, and which may have portions that move with respect to each other. The present invention may be used to render a single frame of animation, or more preferably scenes of animation containing many frames; in addition, the present invention may be used with non-frame based systems that generate instantaneous images, such as computer generated animation for video games and other real time applications. Accordingly, "frames" and "images" are herein understood to be synonymous.

In one aspect the present invention provides for defining a 3D stroke model for a character using collection of strokes in a 3D environment. The stroke model is directly associated with the 3D geometry of the character so that motion of the character in a 3D environment effects motion of the strokes associated with the character. This allows the positions of strokes of the character in the 3D environment to be computed at any instant in time, and for any specific frame of animation. The stroke position information, in conjunction with a camera and lighting model, is then input into a rendering system which renders an image of the character. In practice a single character can be accurately modeled with a relative few number of strokes, on the order of 15 to 50, in contrast to the approximately 1,000 polygons for a polygon-based character. As a result, a frame of animation including even 10,000 characters needs only about 150,000 to 500,000 strokes rendered, which requires just a few minutes to render. Thus, the present invention makes it practical to use computer animation for scenes of large crowds, even scenes lasting several minutes.

In one embodiment, each stroke of a 3D stroke model is preferably defined by a number of control points which are associated with the character's geometric model. Preferably the control points are associated with joints of the character, so that motion of the joints effects motion of the control points. A stroke passes through 1 or more control points. Each control point has attributes such as size, color, transparency, texture, and the like, that can vary the visual characteristics of the stroke as it passes through the control point. Each control point also has a position in the 3D environment, preferably relative to a local coordinate system of the character. The position of a control point over time depends on a defined relationship to the joint (or other geometry) to which it is assigned, which relation determines how the position is derived over time. Derivation of the control point position may be direct (e.g., where the control point is coincident with a joint) or by interpolation (e.g., where the control point is between two or more joints), or extrapolation. The present invention provides a distinctive user interface that enables the user to view the geometric model of the character, and by direct manipulation establish strokes in association with the geometric model, and view the stroke model in various modes and from a variety of positions. The present invention further enables the creation of stroke variations for each character, so that a given character has different stroke models associated with it, enabling the user to choose one of many different stroke models for rendering the character, as desired. The strokes of a character are preferably stored in a stroke database associated with the character. In addition, the character preferably has a joint database defining its joints and their positions over time for some sequence of animation.

In the method of the present invention, the stroke database of a number of characters is created, so that each character to be included in a frame of animation (or a scene) has a stroke model defined for it. Using a motion system, the positions of the characters in the frame or sequence of frames is determined. This produces information defining the position of each portion (e.g., joint) of each character at each of a number of instances in time corresponding to the frames of the scene. This information is of the joint position within the 3D coordinate systems of each of the characters, and not within a global 3D coordinate system containing all of the characters. The stroke databases of the characters and the character position information is input into a stroke generator, which determines the positions of the strokes of the characters within a global 3D coordinate system, and then translates those positions into a 2D coordinate system for a frame of animation. The result is a collection of 2D stroke data, with color, texture, transparency, and other characteristics. This 2D stroke data is input into a frame rendering system which renders the frame using the supplied camera and lighting model. In one embodiment the frame rendering system is a particle renderer, which renders each stroke as a motion of a particle from a beginning point of the stroke to the end point, adjusting for changes in the size, color, texture, and so forth of the particle as it moves. Thus, instead of using the particle renderer, which normally is used with a physics-based (non-geometry) system to simulate particle motion over time, the present invention uses the particle render to draw strokes through a number of positions at single point in time, based on geometry of the strokes.

Animation using strokes has been previously used, however, such systems were limited to 2D "drawing" applications which did not use any underlying geometry of a character to control the motion of the strokes. For example, Hsu and Lee, *Drawing and Animation Using Skeletal Strokes*, SIGGRAPH 1994, p. 109–118, proposed using "skeletal strokes", which are 2D vector based drawing primitives defined along arbitrary paths. Each skeletal stroke (which is limited to a 2D vector) has its own internal L-shaped reference line which can be adjusted to change the aspect ratio of the stroke. However, there is no association of strokes to any underlying character geometry. Thus, skeletal strokes are not applicable to true 3D character animation, nor are they useful for animating large crowds as in the present invention.

DETAILED DESCRIPTION OF THE PREFERRED EMBODIMENTS

STROKE BASED CHARACTER MODELS

Figure 1A:
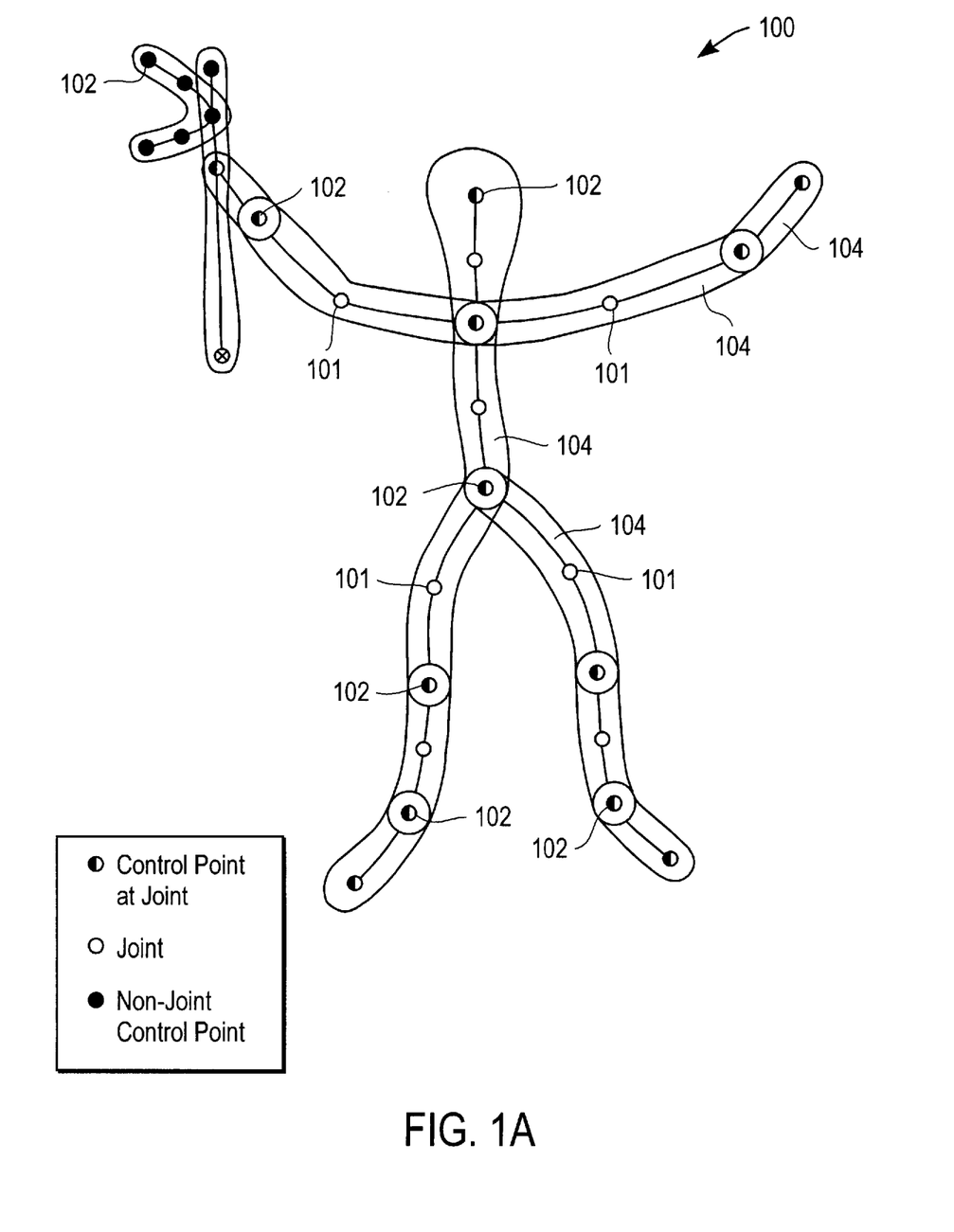
FIG. 1a is an illustration of a stroke model.

The present invention is particularly suited to the animation of images and scenes containing large numbers of characters perhaps thousands, tens of thousands, or more. To fully understand the advantages of the present invention though, it is helpful to begin with a single character. Referring to FIG. 1a, there is shown a schematic illustration of a stroke-based character model 100 of a single character in accordance with the present invention. In this simple illustration, the character is a person holding a battle ax in the right hand. The stroke model 100 is a collection of strokes 104 that are associated with the 3D geometry of a character. Preferably, each stroke 104 is defined by at least two control points 102, one at a beginning of the stroke 104, and one at the end of the stroke. Any number of control points 104 may be defined intermediate to the beginning and end points, but 3–5 control points per stroke are sufficient for most characters.

Figure 1B:
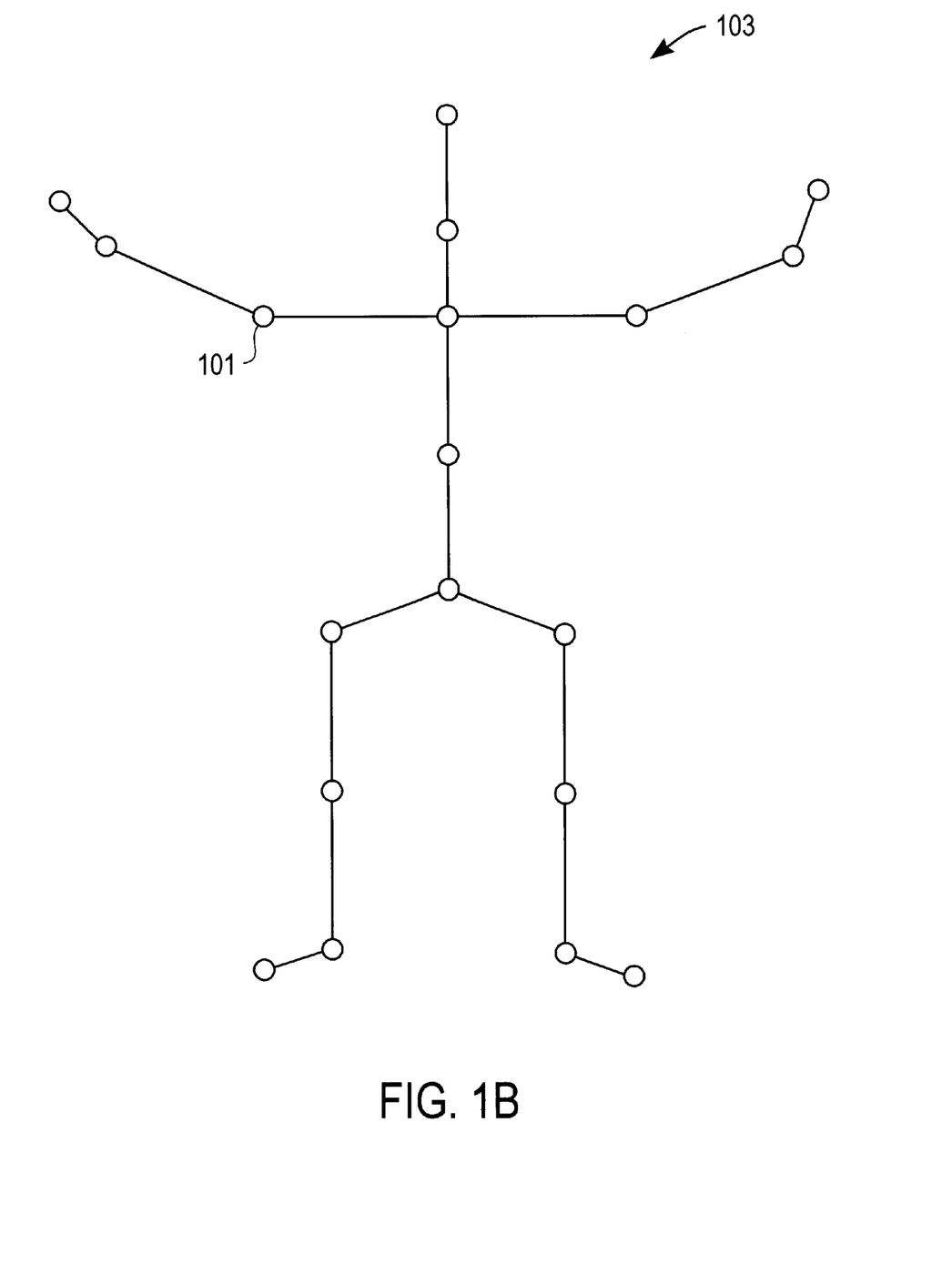
FIG. 1b is an illustration of a joint model.

The control points 102 are associated with portions of the geometry of the character. The geometry of the character may be defined by any of a variety of modeling techniques by which the topology of the character may be represented. Suitable modeling techniques include polygon meshes, skeletons, implicit surfaces, or the like. In a preferred embodiment, the control points 102 are associated with the joints 101 of the character, as defined in a joint model 103. FIG. 1b illustrates a joint model 101 for the character of FIG. 1a. The joint model 103 is a collection of joints 101 of the character, each joint 101 having a position in the character's own (local) 3D coordinate system at a specified time, typically relative to some animation sequence. Thus, for example, a character may have 50 joints, and to define its motion over a 10 second scene quantized at 1 second intervals, there would be position information for each of the 50 joints at each 1 second interval. The position information for the joints over time may be defined as specific (X, Y, Z) coordinates at discrete times T, or as combinations of spline curves an key points in time. In other embodiments, the control points 102 may be associated with any other portion of the character's geometry, such as selected polygon surfaces in polygon based character.

Several aspects about the relationship of control points 102 and joints 101 should be noted. First, control points 102 need not have the same positions as the joints 101. The control points 102 of a stroke 104 may have the same position as the joints 101 the stroke 104 is associated with where it is desirable to have the stroke 104 move exactly as the joints 101 move. The control points 102 of stroke 104 may have positions distinct from the positions of the joints 101 they are associated with. This is shown in FIG. 1a, for example, where the control points 102 of the battle ax are distinct from the joints 101 of the right hand.

Second, not every joint 101 of the character joint model 103 need be associated with some stroke 104, but a joint 101 may be associated with more than one stroke 104. In FIG. 1a, this is shown for the joint 101 at the pelvis of the character which is associated with three different strokes 104, one for thorax, and one for each of the legs. In other words, there is a many-to-many mapping of strokes onto joints, without full utilization of the joints 101 of the joint model 103.

Figure 2:
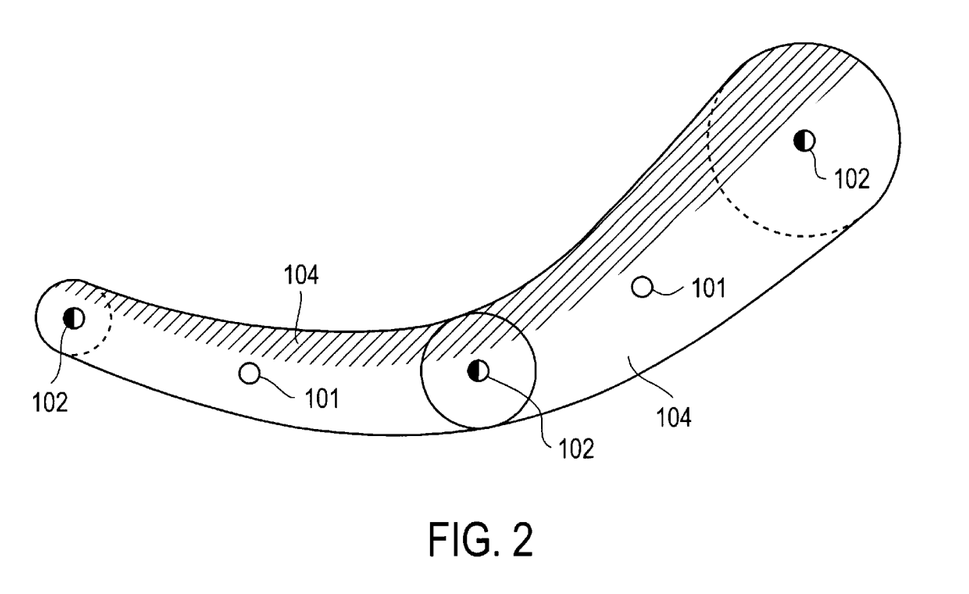
FIG. 2 is a detailed illustration of a stroke.

Each of the strokes is fully three dimensional, and may be understood as a generalized cylinder. A generalized cylinder is the surface produced by extruding a circle along a path through a space, where the radius of the circle can vary along the path. This is accomplished by defining each control point 102 with a number of attributes, one of which is a size (e.g., radius). FIG. 2 illustrates this feature, showing a single stroke of the left leg of the character of FIG. 1a. The stroke has three control points 102, associated with joints 101 roughly corresponding to the hip, knee, and ankle of the character. The stroke starts with a large radius control point 102 at the top (hip), passes through a slightly smaller size control point 102 at the knee, and terminates a small radius control point 102 at the ankle. A stroke passing through its control points 102 thus defines a volume in the 3D coordinate system of the character. As the joints 101 of the character move over time, so too then do the strokes variously associated with the character joints move.

The control points 102 also have other attributes, such as color, texture, transparency that define how the stroke is rendered at and between the control points 102. The surface of the stroke then is determined from an interpolation of the attributes of the control points. The interpolation may be performed using various types of spline curves, including parabolas, Catmull-Rom, or the like, which may pass through or near their associated control points.

Figure 3:
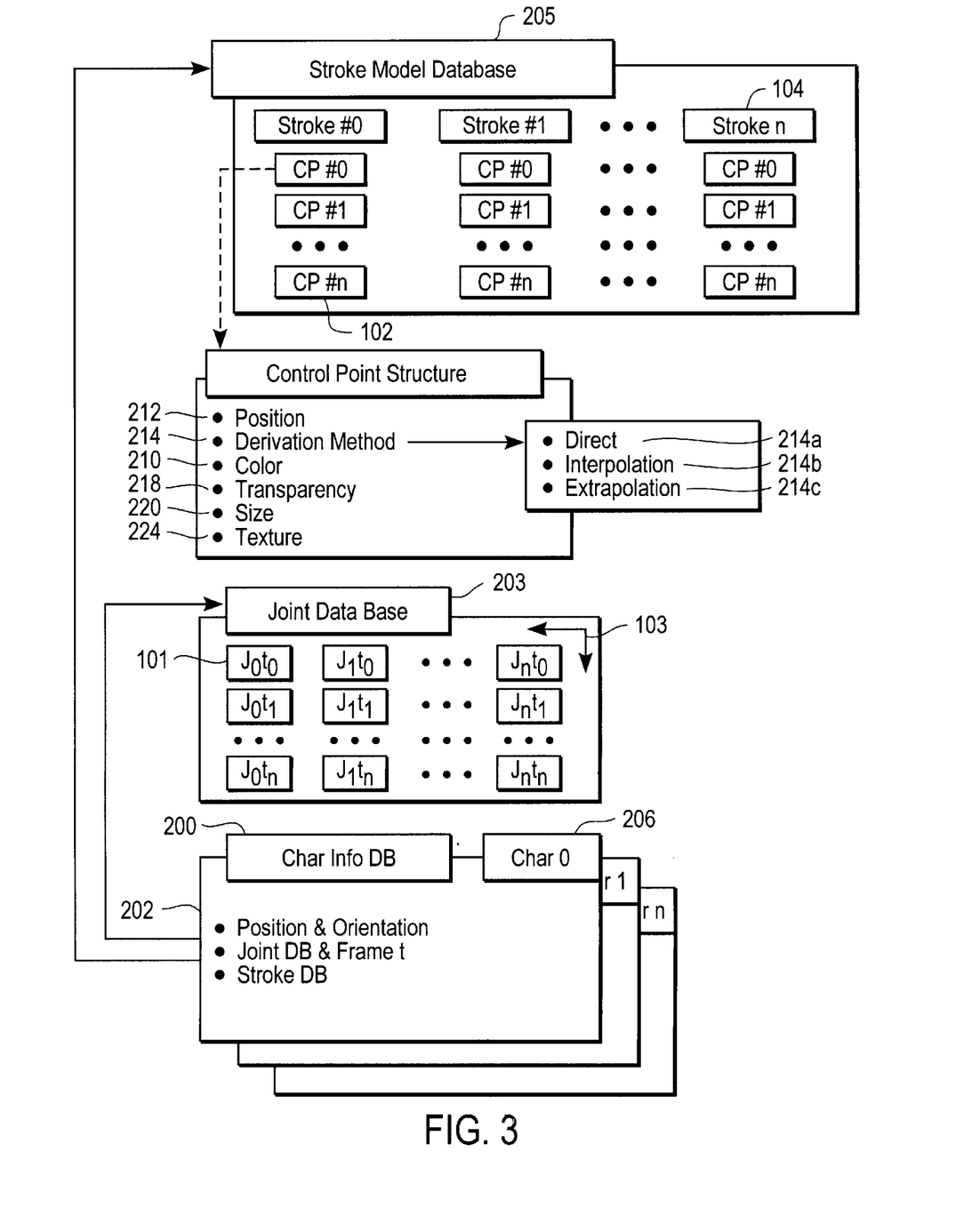
FIG. 3 is an illustration of a data model in accordance with the present invention.

Referring now to FIG. 3 there is shown an illustration of a data model of the relationships of underlying data in one embodiment of the present invention. A character information database 200 stores data defining any number of characters 206, which are preferably unique characters. Each character 206 has geometry position information 202, such as defined by a skeleton and a surface model. This information describes the character with respect to its own local 3D coordinate system. Each character 206 further has orientation data 204 describing a relative orientation to a global 3D coordinate system (i.e. world space) as would be used when the character 206 is instantiated in the global 3D coordinate system prior to rendering a frame. The position and orientation information of a character may be generated from any number of conventional animation systems.

Each character 206 is associated with a joint model 103 and a stroke model 100 stored in respective databases 203, 205. In a preferred implementation, there is a separate database for each joint model 103 and each stroke model 100, each database holding the data for a single character. In a different embodiment, there is single joint model database 203, and a single stroke model database 205, each holding all of the joint models 103 and stroke models 100 for many characters, each such model keyed to its character by some identifying information, such as a character identification code or pathname to the character's geometric model data. Those of skill in the art of system design will appreciate that these implementations are functionally equivalent and one or the other may be preferred for performance reasons of a particular system. In the rest of this disclosure, the former embodiment of each character having its own joint model database 203 and stroke model database 205 will be discussed.

In the joint model database 203, there is defined for the character a plurality of joints 101. Each joint 101 has (X,Y,Z) position information within the 3D coordinate system of the character at a time T; thus a joint $J_i$ at time $T_n$ may characterized as $J_i = \{(X_i, Y_i, Z_i), T_n\}$. Alternatively, it is not necessary to explicitly represent time in the joint models; rather a joint model may simply be a sequence of joint collections of the character, which sequence represents changes in the positions of the joints as the character moves. Thus, the joint model can represent the changes in the topology of the character without explicit encoding of time data. For example, this type of embodiment may be useful in animation systems that do not directly use "frame" type animation, but rather render instantaneous images, such as computer based video games.

In the stroke model database 205, there is defined for the character a plurality of strokes 104, each stroke 104 defined by at least two control points 102. Each control point 102 is defined by a control point structure 222. The control point structure 222 includes the position (X,Y,Z) of the control point 102 in the local coordinate system of the character, the color 210 of the control point 102, the texture 224, the size 220, and the transparency 218 of the stroke. Texture 224 may be specified by reference to a texture map or texture parameters. Size 220 is preferably a radius of the control point 102, though it may be defined as a relative scale value with respect to another control point 102, or a diameter, or by any other computationally efficient manner.

Each control point 102 further has a derivation method 214 which defines how the position 212 of the control point 102 changes with respect to movement of the character. The derivation method is preferably one of the following:

Direct method 214a associates the control point 102 with a specific one of the joints 101 of the joint model 103, and maps the position of the joint 101 to linearly track the motion of the joint, maintaining a fixed (X,Y,Z) vector away from the joint (thus the control point 102 can be non-coincident with the joint and yet linearly bound to its movement). For example, a stroke 104 terminating at a joint 101 representing the elbow or knee of a character would likely be directly mapped, and coincident with the joint 101, but a stroke representing a tennis racquet held in the character's hand would have a distal control point that is non-coincident with a joint of the hand, and yet directly mapped to it.

Interpolation method 214b associates the control point 102 with at least two joints 101 of the joint model 103, and results in the position of the control point 102 being interpolated between these two joints 101 given a desired time, and the joint model 103 defining the positions and times of the joints 101. Interpolation method 214b is preferably a cubic spline interpolation, but other interpolation methods may also be used.

Extrapolation method 214c associates the control point 102 with at least two joints 101 of the joint model 103 and extrapolates the position of the control point 102 from the joint positions at a desired time. Both interpolation and extrapolation may use additional joints to influence the position of a control point.

Each character 206 in the character information database 200 may be associated with one or more stroke models 100; each such stroke model 100 of a character is here termed a stroke model variation. A stroke model variation is simply a stroke model 100 that is distinct from some other stroke model 100 for the same character, e.g., different numbers of strokes or different control points 102, such different joint associations, colors, texture, etc. The use of stroke model variations enables the animator to design a number of stroke models 100 for a character, and selectively choose one of the stroke models 100 for rendering the character in a particular scene.

STROKE BASED SYSTEM ARCHITECTURE

Figure 4:
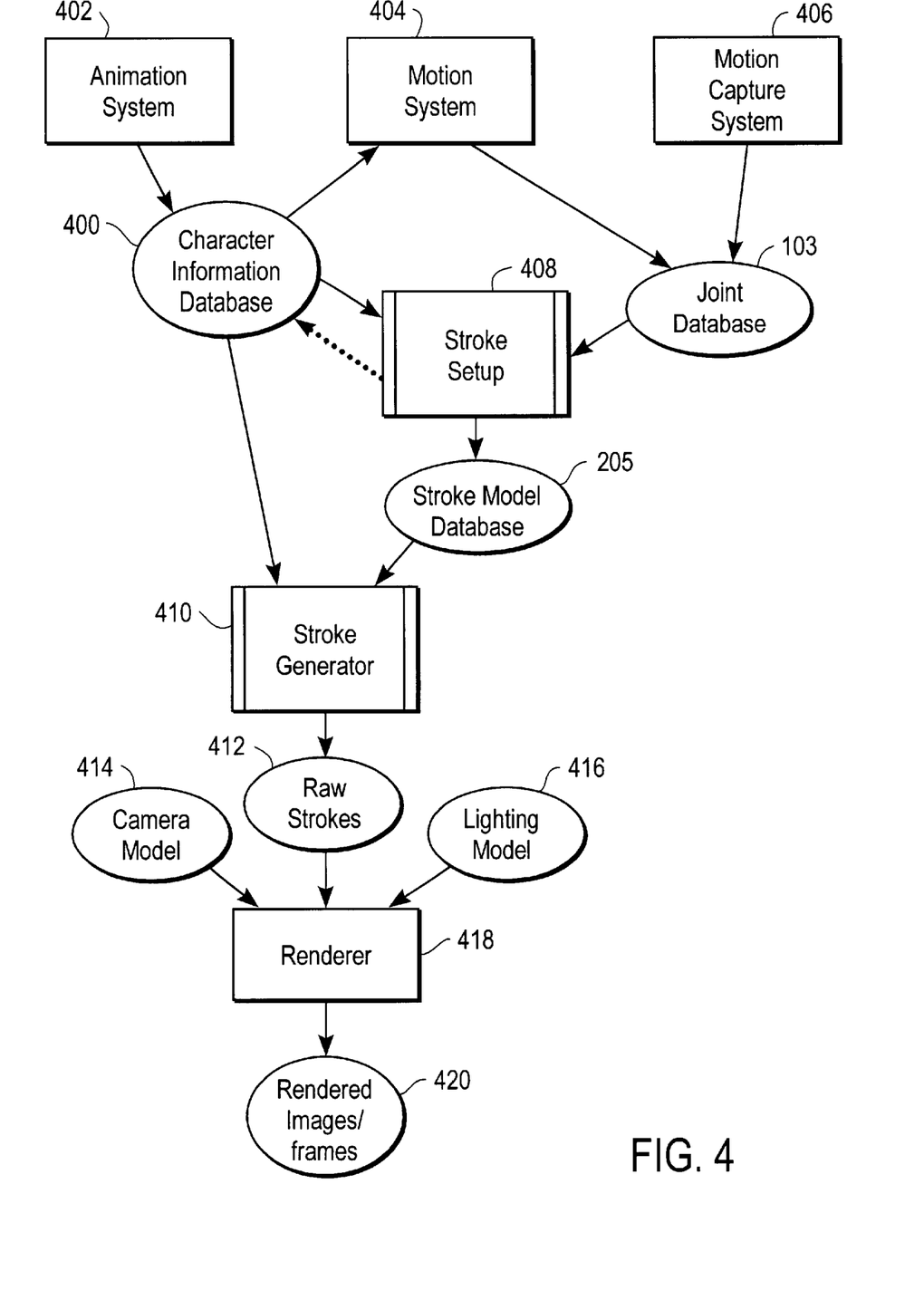
FIG. 4 is a functional model of a system architecture for practicing the present invention.

Referring now to FIG. 4, there is shown a functional diagram of the system architecture for stroke based rendering in accordance with the present invention. Animation system 412 is any of various commercially available animation production environments used to define 3D geometric character models with articulated skeletons. The animation system 412 is here used primarily to create the character information database 200, including defining the number characters, and the type, variation, position, orientation, action played (cycle), and timing (cycle frame) of each character. Suitable animation systems 412 include Maya from Alias|Wavefront of Toronto, Canada.

Separate from the character information database 200, the joint database 203 is constructed. This database may arise from various sources. In a preferred embodiment, the character position 202 and orientation data 204 of the characters 206 is used as an input to a motion system 404, along with timing information (e.g., number of frames, frames per second, etc.). The motion system 404 generates the joint database 203 by creating the character actions, where each character action is defined by a collection of joints in a character's local coordinate system over time. Suitable motion systems 404 include Maya, and Softimage from Softimage of Montreal, Canada. In practice the joint database 203 contains several hundreds of motions, actions, or cycles, each identified with unique identification number, which is used by the character information database 200 to associated character models with joint models.

Alternatively, the joint database 203 may be developed using a motion capture system 406, which extracts motion data from discrete points on live actors or other objects over a time interval. In this embodiment, the extracted point/time data is used as the joint data for a particular character. Suitable motion capture systems 406 include MotionStar from Ascension Technology Corp., Burlington, VT; Vicon Optical Motion Capture System, from Oxford Metrics, Ltd., United Kingdom; or various products from Polhemus, Inc., Colchester, VT.

Figure 5A:
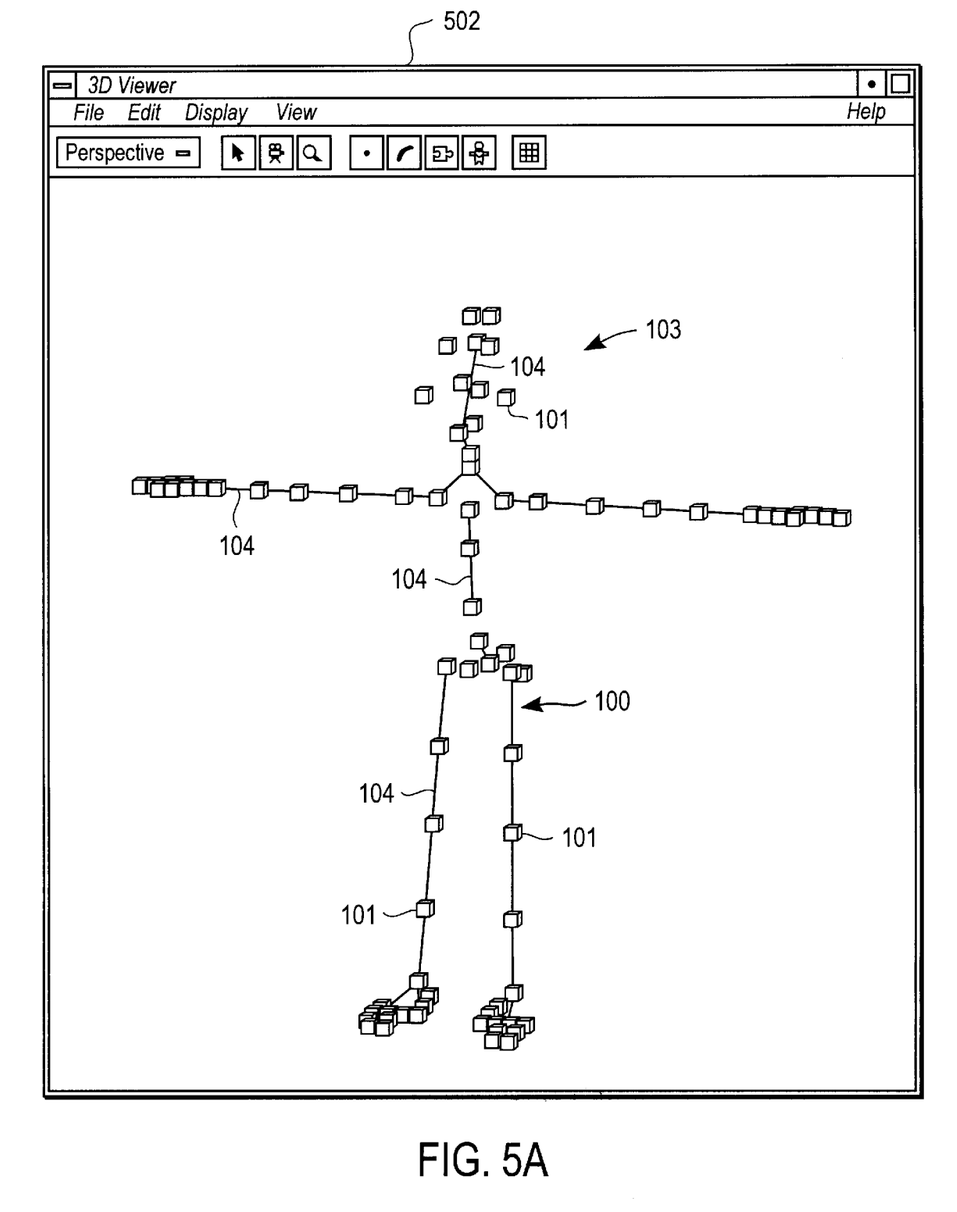
FIG. 5a is an illustration of the user interface of the stroke setup module, showing a joint model and stroke model as connectivity lines.
Figure 5B:
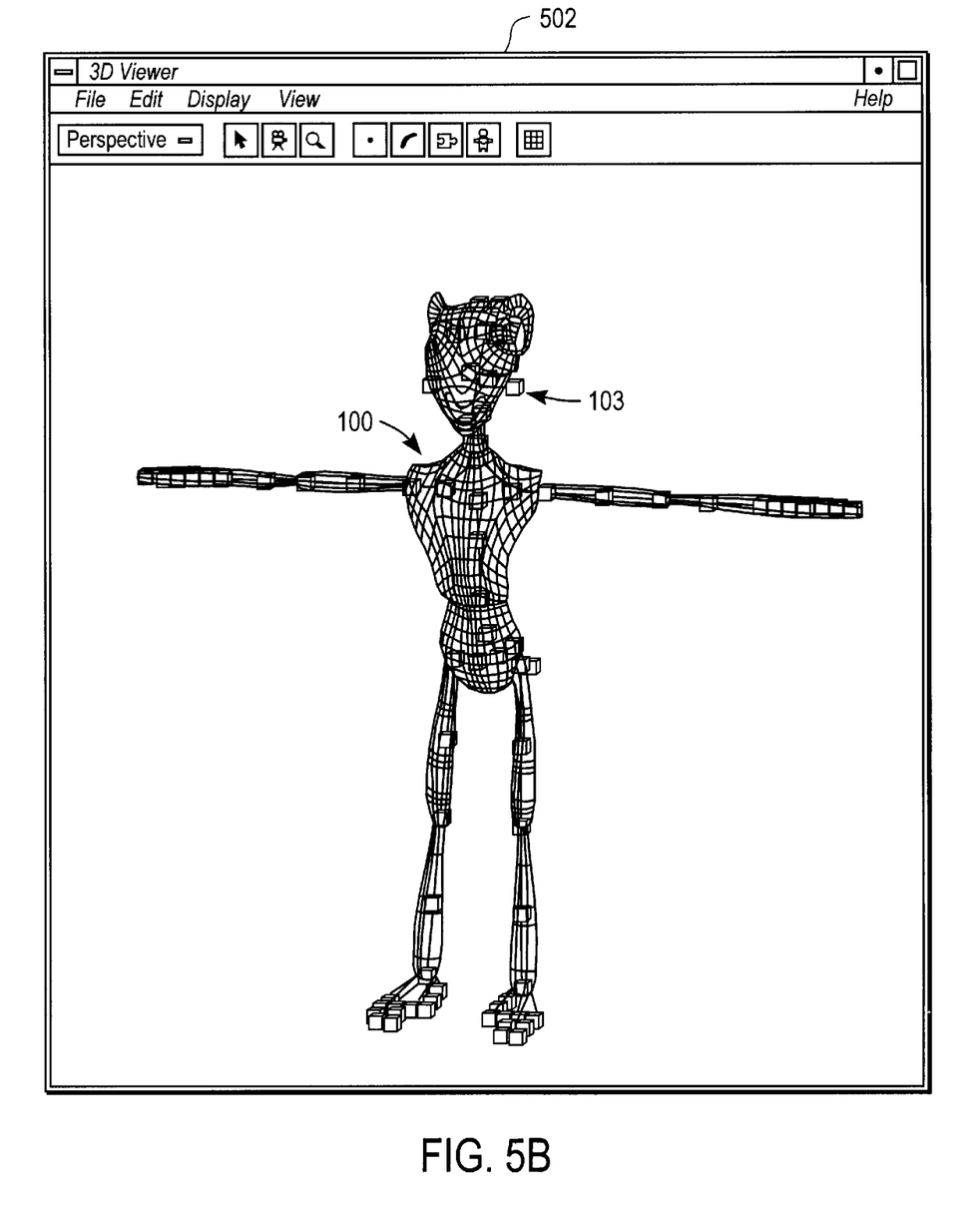
FIG. 5b is another illustration of the user interface of the stroke setup module, showing a joint model and stroke model in wire frame.
Figure 5C:
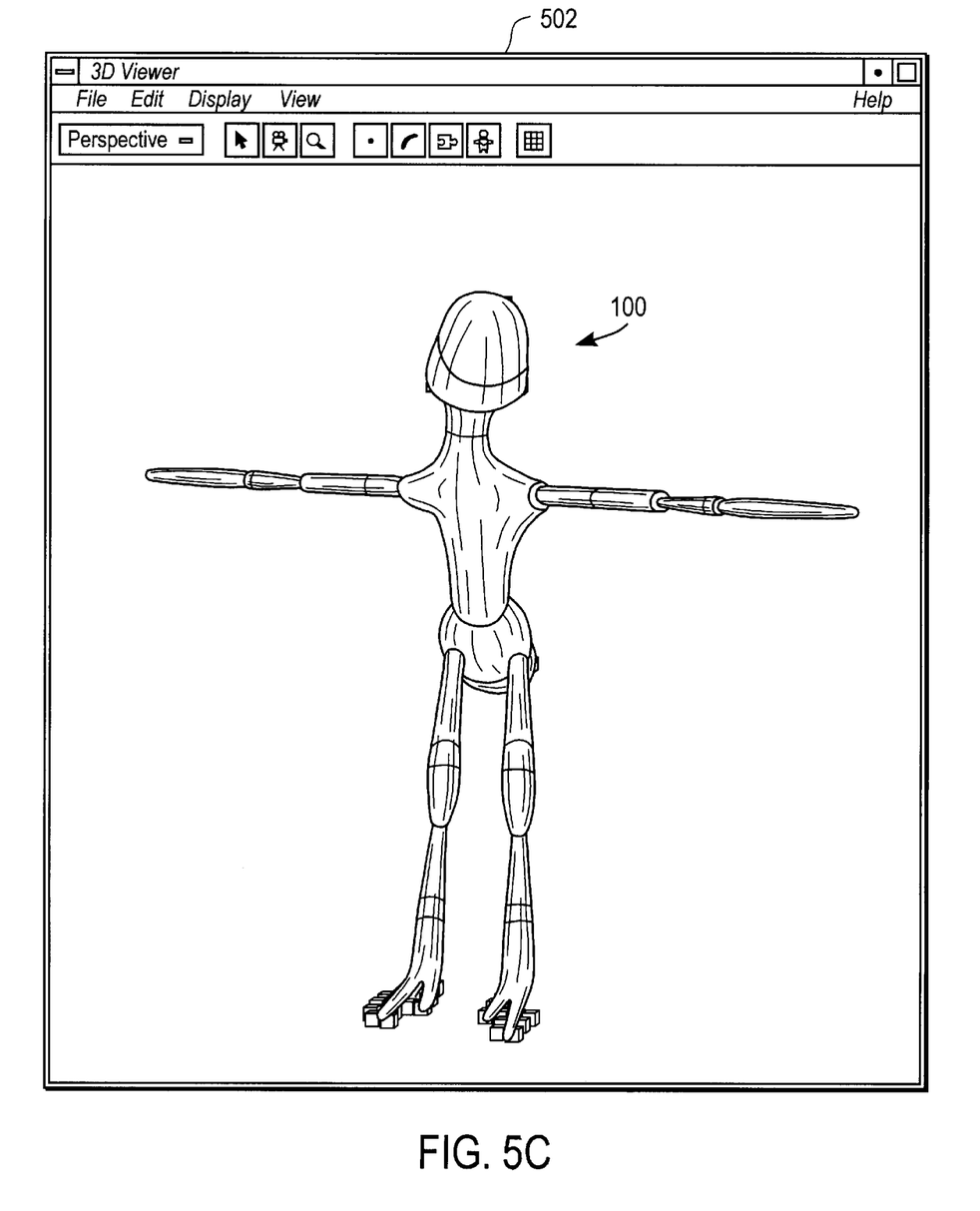
FIG. 5c is another illustration of the user interface of the stroke setup module, showing a solid shaded stroke model.

The character information database 200 and the joint database 203 is input into a stroke setup module 408, in accordance with the present invention. FIGS. 5*a*–5*d* illustrate various screen shots of the user interface of the stroke setup module 408. The module 408 includes two windows, a setup window 500 and a 3D viewer window 502. In the 3D viewer window 502, the user may display the joint model 103 of any character alone (not shown, similar to FIG. 2), the stroke model 100 alone as shown in FIG. 5*c*; or a combination of both the stroke and joint models, as shown in FIGS. 5*a* and 5*b*. The various models may be interactively rotated and zoomed in and out, allowing the user to view the models from any angle or distance. When viewing the stroke model 100, the strokes may be imaged as connectivity lines (FIG. 5*a*), wire frames (FIG. 5*b*), or solid shaded surfaces (FIG. 5*c*).

To create a stroke, the user interactively places a number of control points 102 on or about the joint model 103. The user may select a joint 101 if desired as a control point 102, whereupon the control point 102 is coincident with the joint. In the joint model 100, each joint is given a joint number to identify it, and this joint number may be used to associate the control points to the joints between the respective joint and stroke databases. The various stroke and joint models may be viewed in different projections, including perspective, parallel, and orthogonal.

Referring again to FIG. 5*d*, setup window 500 provides a table interface of the underlying data of the stroke model 100. Table 504 lists each of the strokes 104 by column using a stroke number (0 . . . number of strokes-1). In each column there are rows that provide the joint numbers of the joints with which the stroke is associated. In a preferred embodiment, three control points 102 and joints 101 are used for each stroke 104, here 'start', 'middle', and 'end', for the respective beginning, middle, and end control points 102 of the stroke 104.

Figure 5D:
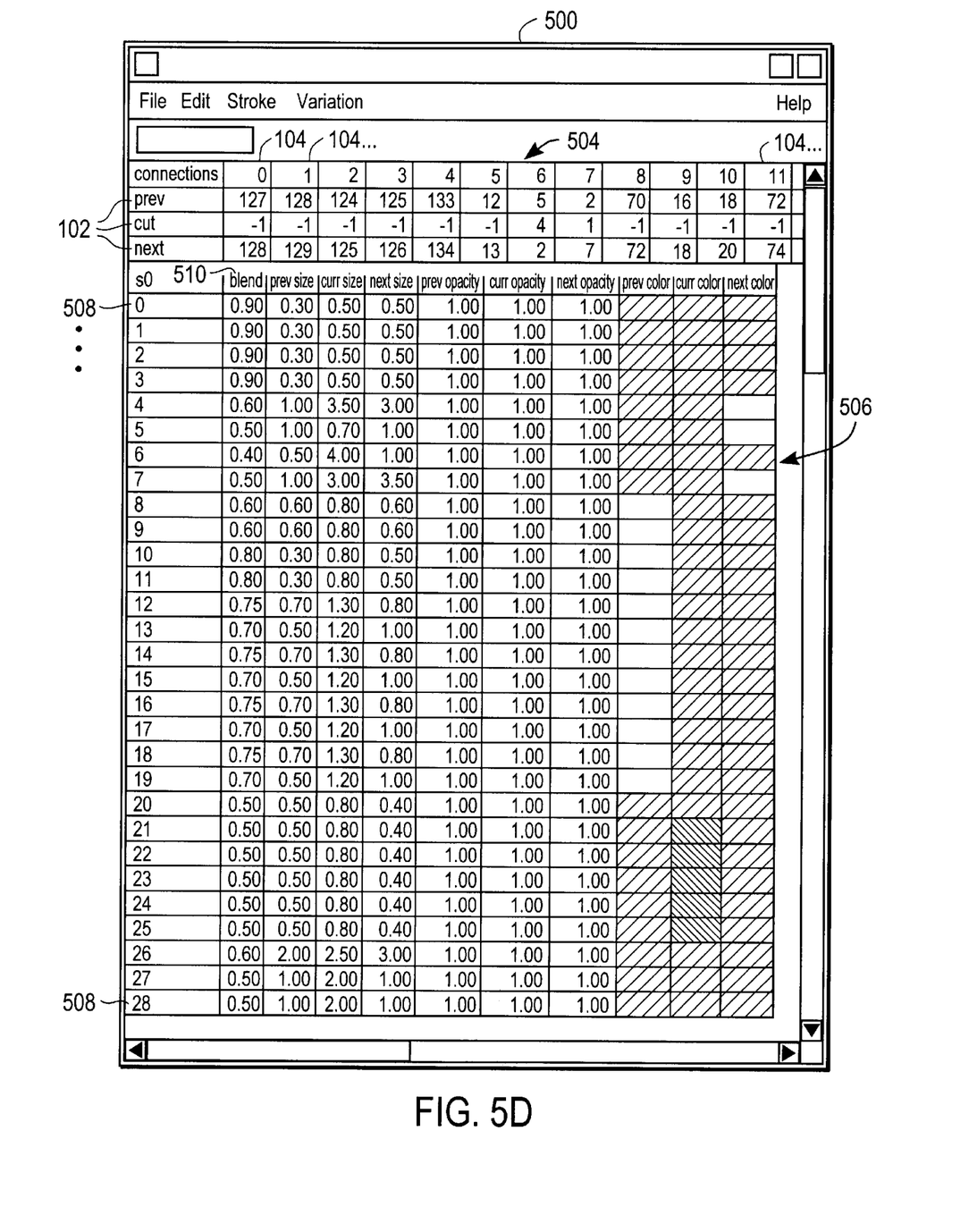
FIG. 5d is another illustration of the user interface of the stroke setup module, showing the details of the stroke and joint data in the stroke setup window.

Table 506 corresponds to an individual stroke model 100, or stroke model variations for the character. Only one table for a stroke model designated "s0" is shown, though scrolling down would reveal further tables 506. Each table 506 lists a row 508 for each stroke, by stroke number. Columns 510 provide the details of the control point attributes of the start, middle, end control points of the stroke for each attribute of size, transparency, color, and so forth. Selecting a different stroke model variation in table 506 causes the stroke setup module 408 to display the corresponding stroke model in the viewer window 502.

Through the stroke setup module 408, the user can interactively define the stroke model 100 for a number of different characters, including stroke model variations. In addition, the setup module 408 interfaces with a rendering system to render the stroke model using a supplied lighting model to provide the user with a view of what the finally rendered character will look like.

More specifically, the user creates a stroke model 100 by first selecting a character from the character information database 200 and the joint model 103 of the character from the joint model database 203. The user then defines any number of strokes 104 as desired. For each stroke, the user establishes, preferably interactively in the 3D viewer window 502, a number of control points 102 in association with selected joints 101 of the joint model 103. For each control point 102, the user defines the attributes of the control point, including the color, texture, transparency, size, and so forth. Suitable dialog boxes and menus may be used to define these parameters, e.g. as a color palette or color wheel for color selection, and a menu or palette of texture maps for textures. The size attribute may be interactively defined by selecting a control point 102 and dragging it to the desired radius.

The output of the stroke set up module 408 is a stroke database 205 associated with the selected character 206 and joint model 103. The stroke database 205 is stored in a computer readable memory accessible to the stroke generator 410.

Returning to FIG. 4, the stroke database 205 and character information database 200 is input into a stroke generator 410. Generally, the stroke generator 410 creates a collection 412 of "raw" 3D strokes for all characters in a given sequence of frames (whether one or many frames). This generally involves computing the positions of the joints 101 of each character instance at the time of each frame in the frame sequence in a global 3D coordinate system common to the all the characters in the frame sequence, and computing the 3D positions of the control points 102 in the global coordinate system using their respective derivation methods 214 to their associated joints. The raw stroke output 412 thus defines the strokes of each character instance in the frame sequence by their control points 102 in each frame and further including the color, transparency, and other visual attributes at each control point 102. The stroke output 412 is formatted in a manner suitable for rendering by a desired renderer capable of rendering generalized cylinders.

Figure 6:
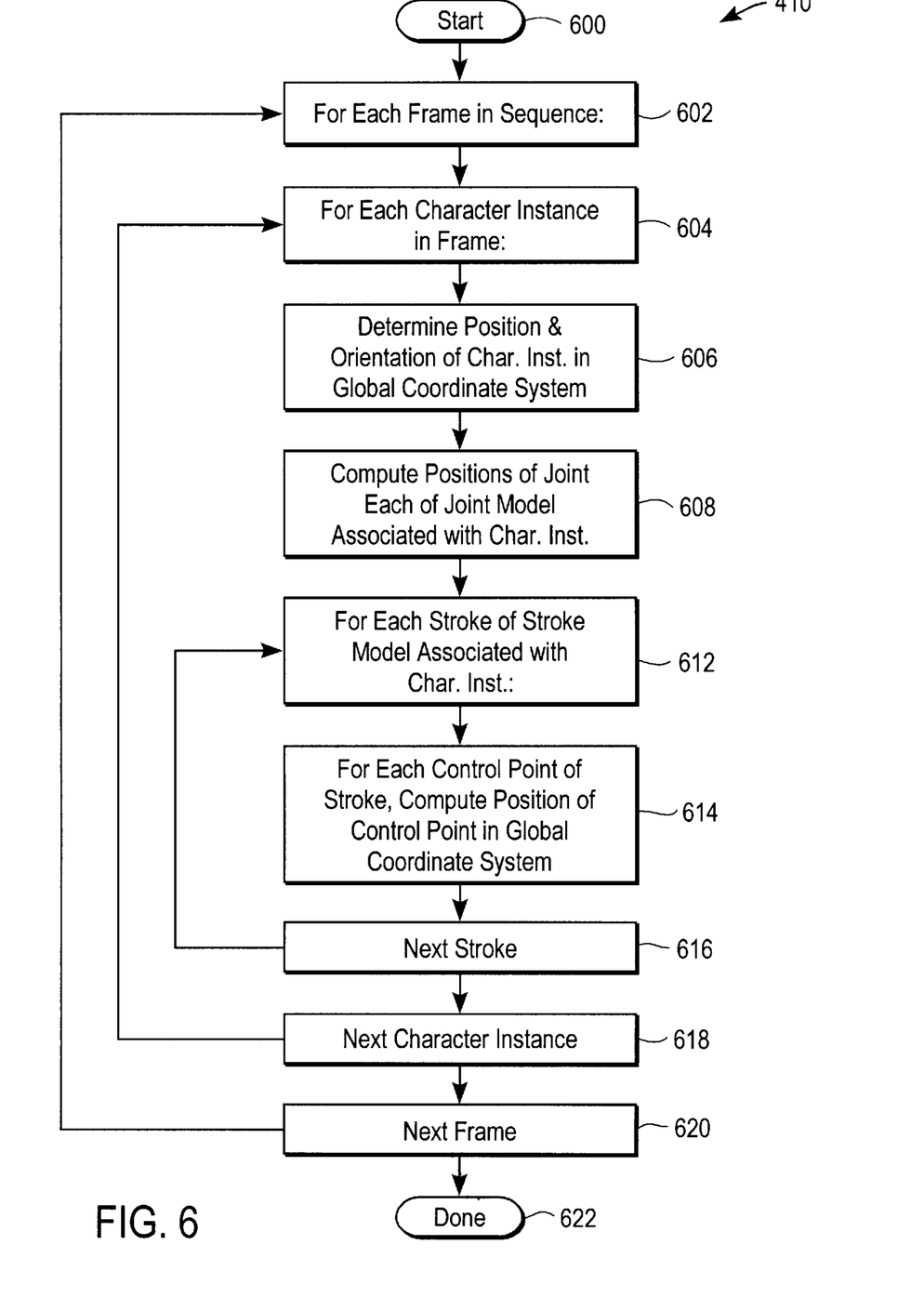
FIG. 6 is a flowchart of the operations of the stroke generator.

Referring to FIG. 6, there is shown a flowchart of the operation of one embodiment of the stroke generator 408, in accordance with the present invention. The stroke generator 408 begins with a user selected frame sequence, which is a sequence of frames or times. The frame sequence includes a number of frames (one or more), each having a specific time associated with it. The stroke generator 408 processes 602 each frame in the sequence. In each frame, there are a number of character instances, as defined by the character database. A character instance is an instantiation of one of the characters defined in the character information database 200; multiple instances of a unique character may be present in a frame. This allows a small number of unique characters to be defined by the designer, and then placed in a frame sequence with a large numbers of instances for each unique character, thereby creating complex scenes of large crowds. For example, a frame of animation may contain a crowd of a 1,000 character instances, each of which is associated with one character in character information database 200, which may contain, for example, only 100 unique characters. Thus, the animator achieves at least a 10 fold reduction of data to uniquely created. More typically, a crowd scene may be based on a small number of unique characters, perhaps 5 to 20, thus providing anywhere from a 200:1 to 50:1 reduction in data needed to define the crowd.

For each character instance in the frame (604), which will likely have a distinct position and/or orientation in the frame, the stroke generator 408 computes 608 the position and orientation of the character instance in a global 3D coordinate system. This computation is directed primarily to the overall geometry of the character instance, particularly its skeleton or surface model.

The stroke generator 408 further computes the positions of each joint of the joint model 103 associated with the character instance. As noted above, each character 206 in the character information database 200 is associated with a joint model 103. The stroke generator 408 accesses this joint model 103, and using the frame time of the current frame, selects the appropriate joints 101, and computes their positions within the global coordinate system.

Next, the stroke generator 408 accesses the stroke model 100 associated with character instance via the character information database 200. The stroke generator 408 processes each stroke 104, and each control point 102 thereof (612–614). For each control point 102, the stroke generator 408 computes 614 the position and attributes of the control point 102 in the global coordinate system at the frame time, using the computed position information of the joints 101 associated with the control point 102, and the derivation method 214 defined for the control point 102. Thus, the information for a computed control point 102 would include its position, color, texture, transparency, size, and so forth for the particular attributes needed for rendering.

When all strokes 104 have been processed (616), the stroke generator 408 continues with the next character instance (618), and then the next frame (620), until all character instances and frames in the frame sequence have been processed. The result is the raw stroke output 412 as described above. Alternatively, rendering (below) may be performed after each frame is processed.

Referring again to FIG. 4, the raw stroke output 412, along with a camera model 414 and a lighting model 416 is input into a renderer 418 for rendering. The camera model 414 is a conventionally defined model. The camera model 414 may include the location of point of view within the global coordinate system, the direction of view, the angle of view or focal length, aspect ratio of view window for the frame, forward and rear clipping planes, and ground plane for shadow definition. The lighting model 420 defines the lighting sources to be used for rendering. A suitable lighting model 420 includes a number of light sources, each with position, color, and intensity, and cone of influence. In addition, in a preferred embodiment of the invention using a particle renderer, its is preferred to define surface hardness for specular highlights and edge hardness for anti-aliasing generally for all points in the frame, rather for individual particles.

The renderer 418 may be any renderer capable of rendering the raw stroke data 412 into a final image, including transforming the 3D position and attribute information of the strokes into pixel color data, accounting for the position of the control points of each stroke, and interpolating as necessary the pixels form such stroke, including the 2D location, color, transparency, and so forth.

More particularly, the renderer 418 renders each frame, using the stroke data, camera model 414, and lighting model 416. In a preferred embodiment, the renderer 418 is a particle renderer. The particle renderer 418 constructs a transformation matrix for transforming the 3D global coordinates of the control points into a 2D coordinate system for the frame, using the camera model 414. The particle renderer 418 then transforms the position information for the control points of each stroke from their 3D global coordinates into a 2D coordinate system for the frame. This transformation includes projecting the size of the control points, thereby producing 2D control points. The particle renderer 418 connects the control points of each stroke using a spline curve, such as a parabola or Catmull-Rom or the like. The resulting stroke may be defined by a curve function or collection of line segments, as desired. In a preferred embodiment, the locations of all the control points in the 2D coordinate space are first determined, and then each of the strokes are connected up through their respective control points to define the pixels in the frame that represent the rendered stroke. In an alternate and equivalent embodiment, each stroke is connected through its control points once its control point locations are computed.

Rendering proceeds with visibility and occlusion determinations, and interpolation of visual attributes, such as color, texture, and the like, for each pixel of the stroke using any desired interpolation scheme. The lighting model 416 is used to adjust the color and brightness of the pixels of a stroke, depending on the color of and distance to the light sources; shadowing based on the geometry of the character or the presence of other strokes may also be employed, along with shading models and specular hardness adjustments. The particle renderer 418 outputs a rendered frame for each frame in the frame sequence, as pixel information for all pixels in each frame.

It will be appreciated at this point that the stroke output 412 for a frame (or sequence of frames) represents a considerably smaller magnitude of data for a given number of character instances than the data for rendering a polygon model of a same number of characters.

Several examples will make this point clear. First, assume a scene with 1,000 character instances, such as battlefield scene, each character instance associated with a stroke model, perhaps richly defined by about 100 strokes. A frame of animation here requires rendering only 100,000 strokes. Since strokes are defined by curves, these strokes are quickly and efficiently rendered, and further render smoothly at even high degrees of resolutions. Also, the smooth rendering of the strokes results in realistic shadow and silhouette effects, further heightening the realism of the frame. In contrast, a 1,000 characters represented by 100 polygons each would render slowly and with roughly, creating jagged silhouettes and shadows, with a noticeable degradation in quality.

Now assume a scene with 10,000 character instances, each with 50 strokes of three control points. In this case there are 500,000 strokes and 1,500,000 control points in the stroke output 412. In a comparable polygon environment producing approximately equivalent quality of final rendering, the 10,000 character instances would each have about 1,000 polygons (each of three vertices), thus making 10,000,000 polygons and 30,000,000 vertices. The present invention thus can represent for example, about 20-fold reduction of the data required to render a frame. Rendering times are even more substantially reduced, since rendering of strokes, particularly using a particle renderer is considerably faster than raytracing, scanline, or radiosity rendering typically used in high-end commercial polygon rendering.

The stroke setup module 408 and stroke generator 410 preferably execute as computer program products in a memory of a computer system, and may be supplied thereto on any useful computer readable medium, such as compact disk read only memory, or the like. The renderer 418 may be software or hardware based, depending on the performance requirements. Those of skill in the art will appreciate the flexibility of the present invention enables it to be usefully embodied with different types of rendering systems, and sources of data. In addition, the implementation and system architecture described herein, along with the user interface features of the stroke setup module 408 or flow operation of the stroke generator 410 may be implemented in other forms, as desired. Accordingly, the scope of the present invention should be determined only with respect to the claims defined below.

We claim:

1. A computer-implemented method of creating a frame of animation for a plurality of objects, the frame having a frame time, the method comprising:

for each object, storing a non stroke-based geometric model defined in a local 3D coordinate system, the model including a plurality of portions, each portion having a position in the local 3D coordinate system;

for each object, storing a stroke model of the object, the stroke model including a plurality of strokes defined in the local 3D coordinate system, each stroke associated with a portion of the non stroke-based geometric model of the object so that a change of position of the portion of the non stroke-based influences a position of the stroke associated with the portion; and for each object, determining positions of the portions of the non stroke-based geometric model of the object in a global 3D coordinate system at the frame time, and transforming the strokes of the stroke model of the object from the local 3D coordinate system of the object into the global 3D coordinate system according to the determined positions of the associated portions.

2. The method of claim 1, wherein each stroke includes at least one control point, each control point associated with at least one portion of the geometric model of the object.

3. The method of claim 2, wherein the non stroke-based portions of the geometric model are joints.

4. The method of claim 3, wherein each control point further includes a position in the local coordinate system of the object and a derivation method defining how the position of the control point is determined with respect to the joints associated with the control point.

5. The method of claim 4, further comprising:

determining the positions of the joints of the object in the global coordinate system as a function of the frame time; and for each control point of each stroke, determining the position of each control point in the global coordinate system according to the derivation method associated with the control point and the determined position(s) of the joint(s) associated with the control point.

6. The method of claim 1, further comprising:

receiving a user selection of a character model including the geometric model of a character;

receiving user inputs selecting portions of the geometric model of the character for association with strokes of a stroke model; and storing the stroke and associations of the strokes to the geometric model as the stroke model.

7. A computer program product for creating stroke models of characters for use in rendering animation sequences, the program product comprising:

a computer readable medium;

a stroke setup module stored on the computer readable medium, and including executable instructions for controlling a processor to perform the operations of:

receiving user inputs selecting a character model of a character including a non stroke-based geometric model of the character defined in a local coordinate system of the character;

receiving user inputs defining a stroke and associating the stroke with user selected portions of the non stroke-based geometric model of the character;

storing a stroke model including the user defined strokes in association with the user selected character model;

a stroke generator module stored on the computer readable medium, and including executable instructions for controlling a processor to perform the operations of:

determining positions in a global coordinate system of portions of a non stroke-based geometric model of a character in an image of animation; and determining positions in the global coordinate system of strokes associated with the portions of the non stroke-based geometric model of the character as a function of the positions of the portions of the geometric model.

8. A computer implemented method of establishing three-dimensional data for rendering an image of animation, the method comprising:

receiving user inputs selecting a non stroke-based geometric model associated with a character, the geometric model defined within a local coordinate system of the character;

receiving user inputs selecting portions of the non stroke-based geometric model and associating the selected portions with strokes;

receiving user input defining rendering attributes of the strokes;

storing the strokes in association with the character;

determining positions of the portions of the non stroke-based geometric model of the character in a global coordinate system with respect to the image;

determining positions of the strokes associated with the selected portions of the geometric model of the character, as a function of the positions of the selected portions in the global coordinate system; and outputting a set of strokes, including for each stroke its position in the global coordinate system and its rendering attributes.

9. The method of claim 8, wherein the selected portions of the geometric model are joints of the character, and determining the positions of the selected portions comprises determining the positions of the joints of the character in the global coordinate system.

10. The method of claim 8, wherein receiving user inputs selecting portions of the geometric model and associating the selected portions with strokes comprises:
   receiving user inputs establishing each stroke as an sequence of control points, each control point having a user selected position in the local coordinate system of the character and user defined size; and
   wherein determining positions of the strokes associated with the selected portions of the geometric model of the character further comprises:
      for each stroke, interpolating a cross-sectional area along a curve in the global coordinate system as a function of the determined positions of joints associated with the sequence of control points of the stroke, the position of each control point, and the size of each control point.

11. A computer implemented method of rendering an image of animation of a plurality of characters, the method comprising:
   storing a database of non stroke-based joint models, each joint model defining a plurality of connected joints of a character, each joint having a position in a local 3D coordinate system of the character, the joint models of each character sequenced to represent motion of the character;
   storing a database of stroke models, each stroke model associated with at least one of the non stroke-based joint models and including a plurality of strokes, each stroke including a sequence of control points, each control point having a position in the local coordinate system, a size, rendering attributes, and association with at least one joint of the associated joint model;
   defining a plurality of instances of characters for inclusion in the image, each instance associated with a sequence of non stroke-based joint models and one of the stroke models;
   for each instance:
      determining the position of each joint of the associated non stroke-based joint model within a 3D global coordinate system for the image;
      determining within the global coordinate system the position and size of each control point of each stroke of the stroke model associated with the non stroke-based joint model as a function of the determined positions of the joints of the joint model; and
      rendering the image using the determined positions of the control points of the strokes, by transforming the positions of the control points in the global coordinate system into positions in a 2D coordinate system of the frame and determining pixel data of each stroke according to its rendering attributes.

12. A system for establishing three-dimensional data for rendering an image of animation, the system comprising:
   first receiving means for receiving user inputs selecting a non stroke-based geometric model associated with a character, the geometric model defined within a local coordinate system of the character;
   second receiving means, coupled to first receiving means, for receiving user inputs selecting portions of the non stroke-based geometric model and associating the selected portions with strokes;
   third receiving means, coupled to the second receiving means, for receiving user input defining rendering attributes of the strokes;
   means for storing the strokes in association with the character;
   first determining means for determining positions of the portions of the non stroke-based geometric model of the character in a global coordinate system;
   second determining means, coupled for the first determining means, for determining positions of the strokes associated with the selected portions of the non stroke-based geometric model of the character, as a function of the positions of the selected portions in the global coordinate system; and
   means for outputting a set of strokes, including for each stroke its position in the global coordinate system and its rendering attributes.

13. A system for generating an image, the system comprising:
   first providing means for providing a non stroke-based geometric model of a character;
   second providing means, coupled to the first providing means, for providing a set of strokes selectively associated with a topology of the non stroke-based geometric model;
   means for generating a plurality of positions of the non stroke-based geometric model of the character to define motion of the character;
   means for determining positions of the strokes as a function of the positions of the geometric model; and
   means for rendering the image using determined stroke positions.

14. A computer program product for manipulating a stroke model of a character for use in rendering animation sequences, the program product comprising:
   a computer readable medium;
   a character information database stored on the computer readable medium, for storing a non stroke-based 3D geometric model of the character for at least one character;
   a stroke model database stored on the computer readable medium, for storing the stroke model of the character, the stroke model associated with the non stroke-based 3D geometric model of the character, and positions of strokes within the stroke model determined responsive to the 3D geometric model for the character;
   a user interface module stored on the computer readable medium, and comprising one or more windows for displaying content to a user; and
   a 3D viewer window adapted to allow the user to view a representation of the stroke model of the character in a 3D coordinate system.

15. The computer program product of claim 14, wherein the 3D viewer window is adapted to show the representation of the stroke model as a wire frame.

16. The computer program product of claim 14, wherein the 3D viewer window is adapted to show the representation as a shaded surface.

17. The computer program product of claim 14, wherein the 3D viewer window is adapted to show a joint model of the 3D geometric model concurrently with the representation of the stroke model.

18. The computer program product of claim 14, wherein the 3D geometric model is displayed in the 3D viewer window and contains one or more selectable control points, each control point associated with at least one stroke.

19. The computer program of claim 14, wherein the user interface module further comprises a setup window, the setup window providing:

a table interface of data defining each stroke of the stroke model.

20. The computer program product of claim 14, wherein the 3D viewer window is adapted to allow the user to define a control point on the 3D geometric model.

21. The computer program product of claim 20, wherein the 3D viewer window is adapted to allow the user to define, for each control point, stroke attributes of a stroke associated with the control point.

22. The computer program product of claim 21, wherein the attributes comprise at least one of size, color, texture, and transparency.

23. The computer program product of claim 22, wherein the size attribute is interactively defined by selecting the control point and dragging it to the desired radius.

* * * * *